Figure 1:
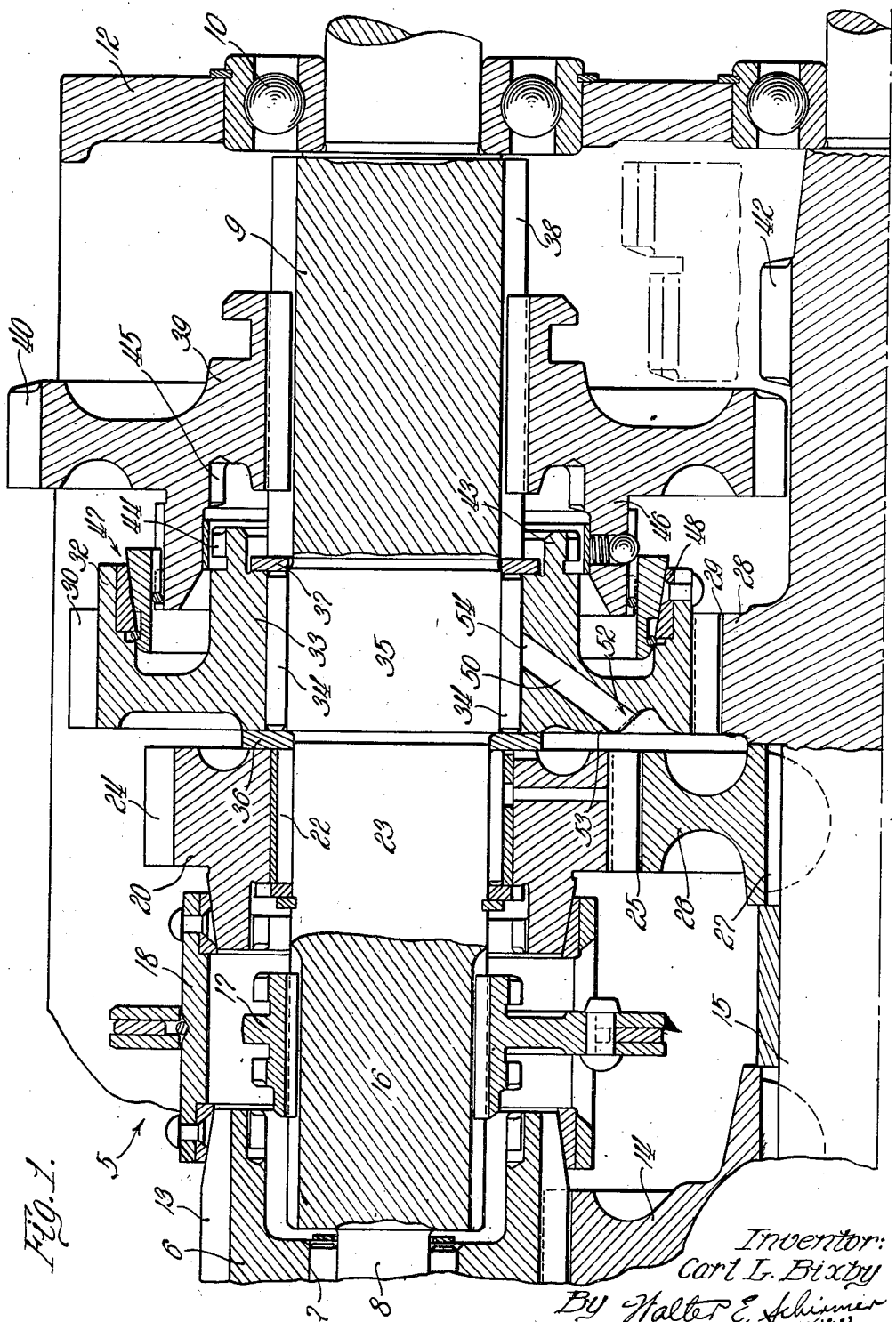

Fig. 2.

Patented June 2, 1942

2,285,142

UNITED STATES PATENT OFFICE 2,285,142

TRANSMISSION

Carl L. Bixby, Berrien Springs, Mich., assignor to Clark Equipment Company, Buchanan, Mich., a corporation of Michigan Application May 6, 1940, Serial No. 333,507

8 Claims. (Cl. 184—6)

This invention relates to transmissions, and more particularly is directed to transmissions of the type used in trucks, busses and similar vehicles in which four or more speeds forward are provided, although not limited thereto.

One of the difficulties of a transmission of this type resides in the inability to properly lubricate certain of the gears which are disposed intermediate other gears and are thereby isolated to some extent from the normal lubricating paths of the transmission arrangement. This is particularly true in the case of second speed gears which are confined against axial movement on the main shaft of the transmission but are rotatably journalled thereon intermediate the first and third speed gears.

The present invention has for one of its primary objects the provision of a gear structure so designed that it is capable of transmitting lubricant thrown laterally against the face thereof radially inwardly toward the center of the gear against centrifugal force to the roller bearings upon which the gear is mounted.

I accomplish this object by providing the gear with diagonally extending passageways leading from the hub portion thereof radially and axially outwardly to suitable boss portions formed on the lateral side face of the gear. The openings for these passageways are disposed in the boss portions in such position as to scoop up lubricant thrown off from the point of meshing engagement of adjacent change speed gears in the transmission.

It is apparent to those skilled in the art that in a transmission construction, lubricant on the gear teeth is thrown off laterally from the point of meshing engagement at a considerable velocity. The present invention makes use of this condition by disposing the gear to be lubricated in such manner that the passageways therein during rotation of this gear pass through the lateral discharge of lubricant with the outer ends of the passageways being so shaped as to receive this discharge and conduct it radially and axially inwardly to the bearings upon which the gear is mounted. The passageways are angled slightly with respect to true radii of the gear, and are also angled with respect to a median radial plane through the gear. As a result the centrifugal force built up by rotation of the gear is insufficient to counteract the velocity of the oil or other lubricant that is forced into the open end of the passageways, and this oil is conducted inwardly to the bearings.

Obviously, it is not desirable to supply the roller bearings upon which a gear is mounted with too much lubricant, as this causes overheating of the bearings and also rapid destruction of the characteristics of the lubricating oil. By the present invention, I find that sufficient lubrication is produced in the rotatably mounted gear, but that over-lubrication is prevented, and, as a consequence, a cool, smooth running gear mounting is provided which is adequately lubricated.

Other objects and advantages of the present invention will appear more fully from the following detailed description which, taken in conjunction with the accompanying drawings, will disclose to those skilled in the art the particular construction and operation of the present invention.

In the drawings:

Figure 1 is a transverse sectional view through a transmission embodying the present invention; and Figure 2 is a side elevational view of the gear with cooperating portions of the transmission shown diagrammatically.

Referring now in detail to the drawings, a transmission is indicated generally at 5 comprising the clutch shaft 6 having the recessed end 7 in which is piloted the stub end 8 of a transmission main shaft, indicated generally at 9, which, at its opposite end, is carried in bearings 10 secured in the rear end wall 12 of the transmission housing. The clutch shaft 7 is provided with the conventional external gear teeth 13 meshing with the teeth on the gear 14 keyed or otherwise secured to a countershaft 15. The portion 16 of the transmission main shaft is splined to receive the clutch sleeve 17 which, together with the synchronizer sleeve 18, provides means for directly clutching the shaft 6 to the shaft 9 in the manner described in detail in the copending application of Leo A. Bixby and Robert Lapsley, Serial No. 298,391, filed October 7, 1939.

A second gear 20 is rotatably mounted by bearings 22 upon the portion 23 of the shaft 9, and is adapted to be clutched to the shaft 9 through the synchronizer mechanism described in detail in the aforesaid copending application. The gear 20 is provided with the external gear teeth 24 which are in constant meshing engagement with the teeth 25 of the gear 26 keyed as at 27 to the countershaft 15. Inasmuch as both of the gears 20 and 26 are secured on their respective shafts against axial displacement, it will be apparent that they are rotated at all times that power is being introduced into the transmission through the clutch shaft 6, since the shaft 6 and the countershaft 14 are in constant meshing engagement.

The countershaft is provided axially rearwardly of the gear 26 with an integrally formed gear portion 28 having gear teeth 29 meshing with the teeth 30 of a second speed gear 32, which gear is provided with the hub portion 33 mounted as by means of roller bearings 34 upon the portion 35 of the shaft 9. The gear 32 is locked against axial movement by means of the thrust washers 36 and 37 at opposite ends thereof, the washer 37 being secured in position against the enlarged splined portion 38 of the transmission main shaft which carries the axially shiftable first speed gear 39 having external teeth 40 adapted to be shifted axially rearwardly from the position shown in Figure 1 into meshing engagement with the gear teeth 42 carried by the countershaft.

The hub portion 33 of the gear 30 is provided with the axial extension 43 having external clutch teeth 44 adapted to be engaged by the internal clutch teeth 45 carried within the axial extension 46 of the gear 39 when the gear 39 is shifted to the left, as viewed in Figure 1. Suitable synchronizing means, indicated generally at 47, is carried upon the axial extension 46 of the gear 39, and cooperates with the friction surface 48 carried adjacent the periphery of the gear 32 in the manner described in the copending application of Robert Lapsley, Serial No. 319,661, filed February 19, 1940, and it is not believed that any detailed description thereof is necessary herein.

The gear 32, as shown more in detail in Figure 2, is provided with circumferentially spaced ports or passageways 50 which have their axes slightly offset relative to the radial planes defined by the lines A, B and C, the angular displacement between the axes of the passageways 50 and the radial lines passing through the center of the outer ends 52 of these passageways being approximately 5°, although this may be varied, depending upon the gear ratios in the transmission which control the speed of rotation of the gear 32. It should also be noted that the passageways 50 are inclined in an axial direction, the outer ends 52 thereof opening into bosses 53 formed in the lateral face of the gear 32, while the inner ends thereof, indicated at 54, open into the internal angular surface of the hub 33 substantially at the axial center thereof.

Due to this angular inclination of the passageways 50, it will be apparent that the ends 52 of these passageways open out at a radial distance equivalent to the point of meshing engagement of the teeth 24 and 25 of the gears 20 and 26. Since these teeth are in constant meshing engagement, the operation of the transmission will result in the discharge laterally from the point of meshing engagement of these teeth in an axial direction toward the outer end 52 of the passageways 50 as they rotate by this point. This causes the defining edges of the ports 52 to be angled or cocked to lie in the plane of the inclined boss surface 53, the trailing side of this defining edge, indicated at 51, projecting further outwardly toward the point of meshing engagement than the leading side of this edge, considered with respect to the direction of rotation of the gear 32, as indicated by the arrow in Figure 2. Since the lubricant discharged from the meshing gears 20 and 26 is directed both laterally and also tangentially in the direction of rotation, the resultant direction of this lubricant approaches the angle of cocking of the passageways 50. This, in effect, provides for receiving the oil thrown off from gears 20 and 26 and directing this oil at considerable velocity into the passageway without too rapid a change in its direction of movement, due to the angular offset of the passageway. The bosses 53 formed in the lateral face of the gear 32 bring the ports 52 closely adjacent the point of meshing engagement whereby the full value of this scooping action can be realized. As a result, a certain proportion of this lubricant discharge is forced into contact with the annular surfaces of the bearings 34 and provides a thin film of lubricant sufficient for adequate lubrication of the bearings.

It is therefore believed apparent that I have provided a novel means for insuring lubrication of a rotatably journalled gear which is so isolated as to render other lubricating means undesirable, and the construction also provides for controlled amounts of lubricant being passed to the bearings of this journalled gear.

I am aware that various changes may be made in certain details of the present construction, and I therefore do not intend to be limited except as defined by the scope and spirit of the appended claims.

I claim:

1. In combination, in a transmission gear having a hub portion journalled on antifriction bearings, a plurality of circumferentially spaced bosses formed on one lateral face of the gear, ports in said bosses, pockets in said bosses opening into said ports, and passageways extending laterally and radially inwardly from said bosses and opening into the hub of said gear.

2. The combination of claim 1 wherein the axes of said passageways extend at a slight angle to transverse radial planes through the axes of said ports.

3. In a gear having a hub adapted to be journalled on antifriction roller bearings, a plurality of circumferentially spaced bosses formed on one lateral face of said gear, a plurality of passageways extending from the hub of said gear laterally and radially outwardly toward said bosses and terminating in ports in said bosses, said passageways having their axes arranged so that one side of the defining edge of the port opening at each boss acts as a lubricant receiving pocket upon rotation of said gear in one direction.

4. In combination, in a transmission, a pair of parallel shafts, a pair of constantly meshing gears on said shafts, a third gear having a hub, bearing means in said hub rotatably journalling said third gear on one of said shafts immediately adjacent one of said pair of gears, said third gear being of a larger diameter than said adjacent one of said set of gears, and circumferentially spaced port means in the adjacent lateral face of said third gear adapted to rotate past the point of meshing engagement of said pair of gears and including radially and axially inwardly extending passageways to the hub thereof for receiving lubricant thrown laterally from said point and directing it into the bearing means of said third gear.

5. The combination of claim 4 wherein said circumferentially spaced means includes bosses projecting from the lateral face of said third gear to bring the inlet end of said passageways into close proximity to said point of meshing engagement.

6. The combination of claim 4 further characterized in that the axes of said passageways are cocked slightly relative to radii of said third gear and the inlet ends thereof have defining edges providing a lubricant receiving pocket.

7. In combination, in a transmission having a pair of parallel shafts, a set of constantly meshing gears on said shafts, a third gear rotatably journalled on one of said shafts immediately adjacent one of said set of gears and of a larger diameter, said third gear at all times rotating slower than said adjacent one of said set of gears, circumferentially spaced bosses formed in the lateral face of said third gear having ports therein disposed at a radius equal to the pitch radius of said adjacent gear of said set of gears, said third gear having passageways leading radially and axially inwardly from said ports to the hub of said third gear, whereby lubricant forced laterally outwardly from the point of meshing engagement of said set of gears is directed into said ports as they rotate past said point and forced through said passageways into the hub of said third gear.

8. The combination of claim 7 wherein said passageways are cocked forwardly out of a normal radial plane through said third gear so as to be inclined in the resultant direction of the discharged lubricant thrown from said meshing gears.

CARL L. BIXBY.